Watch.

2,189 — Reissued Mch. 6. 1866.

Witnesses;
W. H. Hunnage
F. A. Alden

Inventor;
M. Burt

UNITED STATES PATENT OFFICE.

MERRITT BURT, OF CLEVELAND, OHIO.

IMPROVEMENT IN WATCHES.

Specification forming part of Letters Patent No. 44,161, dated September 13, 1864; Reissue No. 2,189, dated March 6, 1866.

*whom it may concern:*

Be it known that I, MERRITT BURT, of Cleveland, in the county of Cuyahoga and State of Ohio, have invented new and useful Improvements in Watches; and I do hereby declare that the following is a full and complete description of the construction and operation of the same, reference being had to the accompanying drawings, making part of this specification, in which—

Figure 1:
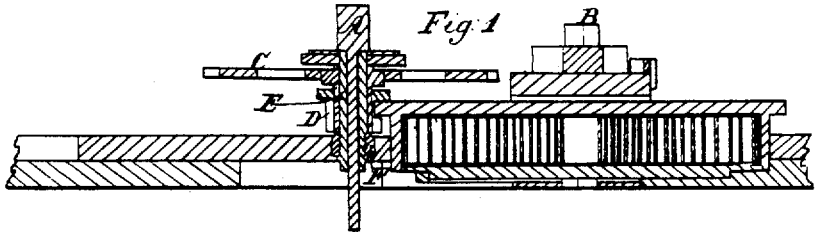
Figure 3:
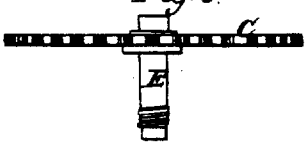
Figure 4:
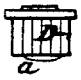
Figure 5:
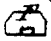
Figure 6:
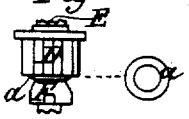
Figure 2:
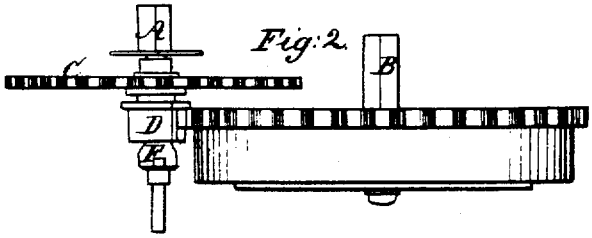

Figure 1 is a sectional view of the fusee and center wheel with the improvements attached. Fig. 2 is a side view of the fusee and center wheel with the improvements put together. Fig. 3 is a side view of the center-wheel with a hollow shaft or arbor and showing the thread of the screw on the lower end. Fig. 4 is a side view of the hollow friction-pinion, and Fig. 5 is the nut that secures the pinion in place upon the shaft. Fig. 6 will be referred to hereinafter.

Like letters of reference refer to like parts.

The nature of my invention relates to so connecting one of the pinions of a watch-train to its own arbor or shaft that said pinion will turn with its arbor in the ordinary running of the movements, and at the same time turn independently of it in case of any sudden recoil or rupture of the mainspring or too much strain upon the wheels when being wound up or therwise, thereby preventing injury to the train, also, to a hollow shaft secured to and working conjointly with a center wheel, and h at the same time operates with or independently of the pinion on said shaft, as case may require, in winding the watch rupture of the mainspring.

The general structure of the watch remains unchanged to which my improvement is applied.

A represents the center-post.

B represents the arbor to the drum.

C is the center-wheel.

D is a hollow friction-pinion, (shown in place in Figs. 1 and 2 but detached in Fig. 4,) and which may be placed upon any kind of a watch center-shaft so as to turn conjointly with or without its arbor, as hereinafter specified.

E represents a hollow shaft through which the center-post A passes, and to said shaft is connected the pinion D, and held in place thereon by a screw-nut. The center-wheel C is rigidly attached to the shaft E, while the the pinion D is caused to turn with the shaft and in concert with the wheel C by its friction upon it. This friction may be increased or diminished by the adjustment of the nut F upon the shaft E. This adjustment and pressure may be increased in delicacy by interposing a concave washer, *a*, Fig. 6, between the nut and pinion. This washer, if made of very thin metal, acts as a spring, and would give a very nice adjustment of pressure. The operation is as follows: When the watch is in motion as a time-keeper, the pinion D, shaft E, and wheel C rotate in concert.

In the ordinary winding and running of the watch the pinion D does not turn upon the shaft E, but if the winding is continued beyond the limits of the spring, the pinion is caused to turn upon the shaft independent of the other movements, thus relieving the teeth and leaves of the train from undue strain, and in case the mainspring should break while winding, or at any other time while the watch was in motion, the pinion D would turn upon the shaft E, and thus save the teeth of the wheels from being broken.

Thus by my improvement, injury to the train or the usual bad effects which result from the sudden recoil of the mainspring in case of its rupture is avoided when wound or partly wound up, and prevents any injury to the teeth of the barrel or leaves of the pinions or any part of the train when wound up with too much force.

The pinion D will turn in either direction upon the shaft E without entire disconnection with the train, so as to attain a threefold object—to relieve the works from any undue strain in winding, the effects of recoil, and rupture of the mainspring.

What I claim as my improvement, and desire to secure by Letters Patent, is—

1. So connecting a pinion of a watch-train to the center shaft or arbor that said pinion will turn with it in the ordinary running of the movements and at the same time turn independently of it in case of any sudden recoil or rupture of the mainspring or undue strain upon the levers when being wound up or otherwise, for the purpose specified.

2. In combination with the center shaft of a watch-train, a hollow friction-pinion thereon, so as to turn with or independent of its arbor without clicks or ratchets, substantially as and for the purpose described.

3. Holding or supporting the friction-pinion D in place upon its shaft or arbor by means of a screw-nut, substantially as set forth.

4. The combination of a spring-washer and nut with a friction-pinion and its shaft of a watch-train, substantially as and for the purpose set forth.

MERRITT BURT.

Witnesses:
W. H. BURRIDGE,
A. W. MCCLELLAND.